(12) United States Patent
Kawaguchi et al.

(10) Patent No.: US 10,541,002 B2
(45) Date of Patent: Jan. 21, 2020

(54) IMAGING APPARATUS AND IMAGING METHOD

(71) Applicant: Olympus Corporation, Hachioji-shi, Tokyo (JP)

(72) Inventors: Katsuhisa Kawaguchi, Hachioji (JP); Masaomi Tomizawa, Hachioji (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 47 days.

(21) Appl. No.: 15/878,404

(22) Filed: Jan. 23, 2018

(65) Prior Publication Data
US 2018/0218755 A1 Aug. 2, 2018

(30) Foreign Application Priority Data
Jan. 31, 2017 (JP) .................. 2017-015851

(51) Int. Cl.
| H04N 5/77 | (2006.01) |
| G11B 27/00 | (2006.01) |
| H04N 5/93 | (2006.01) |
| G11B 27/031 | (2006.01) |
| G06K 9/66 | (2006.01) |
| G06K 9/00 | (2006.01) |
| H04N 5/91 | (2006.01) |
| G06K 9/62 | (2006.01) |
| H04N 5/84 | (2006.01) |
| H04N 5/89 | (2006.01) |

(52) U.S. Cl.
CPC ........ *G11B 27/031* (2013.01); *G06K 9/00751* (2013.01); *G06K 9/6215* (2013.01); *G06K 9/66* (2013.01); *H04N 5/91* (2013.01)

(58) Field of Classification Search
USPC .................. 386/225, 278, 282, 333, 326
See application file for complete search history.

(56) References Cited

U.S. PATENT DOCUMENTS 8,289,433 B2 * 10/2012 Hara ................. H04N 5/23293
   348/222.1
2018/0124297 A1 * 5/2018 Matsuhashi .......... H04N 5/2353

FOREIGN PATENT DOCUMENTS

JP     2005-167377     6/2005

* cited by examiner

Primary Examiner — Daquan Zhao
(74) Attorney, Agent, or Firm — John C. Pokotylo; Pokotylo Patent Services

(57) ABSTRACT

An imaging device, comprising, an image sensor that acquires a plurality of images by repeatedly shooting an object at a first timing, a memory that stores the plurality of images, a second selection section that selects images at a second timing from among images stored in the memory, and a controller that has a movie candidate section that determines movie candidate frames from among the plurality of images in accordance with comparison results of images that have been selected or not selected at the second timing.

20 Claims, 7 Drawing Sheets

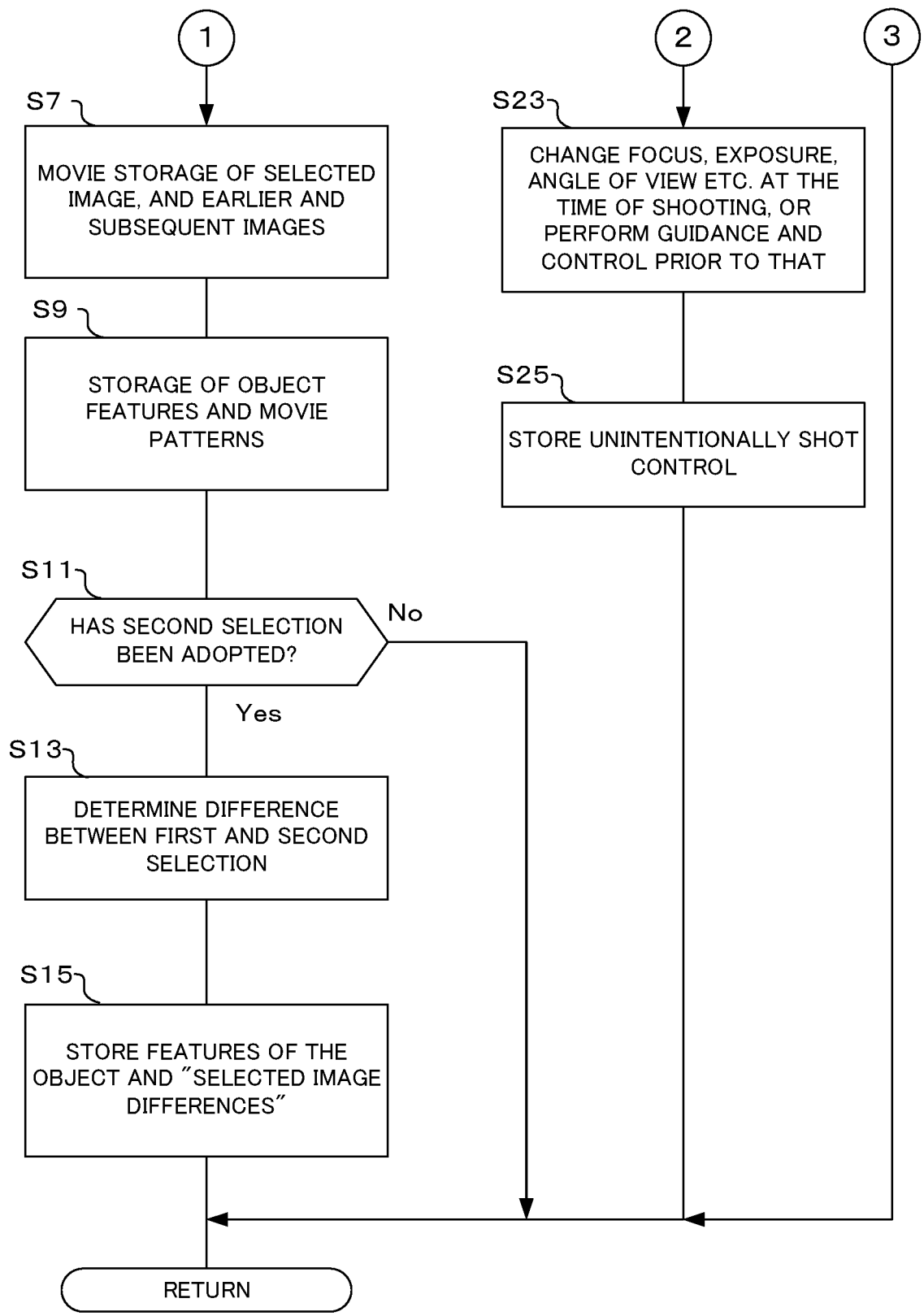

US 10,541,002 B2

IMAGING APPARATUS AND IMAGING METHOD

CROSS-REFERENCE TO RELATED APPLICATIONS

Benefit is claimed, under 35 U.S.C. § 119, to the filing date of prior Japanese Patent Application No. 2017-015851 filed on Jan. 31, 2017. This application is expressly incorporated herein by reference. The scope of the present invention is not limited to any requirements of the specific embodiments described in the application.

BACKGROUND OF THE INVENTION

1. Field of the Invention

The present invention relates to an imaging apparatus and an imaging method that are capable of shooting a still image, and also of shooting a movie before and/or after still image shooting (including a series of images acquired by continuous shooting of still images).

2. Description of the Related Art

It has become possible in recent years to easily shoot movies, but within a movie that has been taken there are also operational errors and erroneous imaging, as well as images that are not in line with the photographer's intention. The photographer therefore performs editing of the movie after movie shooting. However, searching for these images from within the movie, and editing, requires time to playback the movie and is also complicated.

A movie editing device that detects, in image data that has already been stored, sections that have a high possibility of being deleted or amended at the time of editing by movie analysis, and displays that information at the time of editing together with image data, has therefore been proposed in Japanese patent laid open No. 2005-167377 hereafter referred to as "patent publication 1"). This movie editing device obtains luminance distribution, luminance differential value distribution, motion vector distribution etc. for every frame, calculates an evaluation value for respective determination items for determining "sharp and vivid", "slight movement", "slight change in movement", "not too light or not too dark", "not too many blown out highlights or black shadows" etc., and detects NG frames for which this evaluation value does not satisfy a threshold value. Sections in which NG frames are continuous are then made NG candidate sections, and NG candidate sections that have been detected for every determination item are displayed together with the movie on a time axis of a GUI.

In this way, the movie editing device disclosed in patent publication 1 automatically detects images resulting from general operation errors and erroneous shooting, and displays this image as an NG candidate which simplifies movie editing. However, the level of operation error or erroneous shooting will differ depending on the photographer, and further, personal preference will differ even within images in which there are no operation errors or erroneous shooting. This is because compositional preference, exposure conditions, etc., differ depending on the photographer. This means that with the movie editing device disclosed in patent publication 1, performing editing of a movie in line with the photographer's intention is insufficient.

Also, in recent years, it has also become easy, together with performing still image shooting, to shoot many still images using rapid shooting etc. before and after the still image shooting. Even if it is possible to locate a photographer's favorite images from among still images of a number of frames, it is not easy to locate the photographer's favorite images from among a great number of the still images. This means that with the movie editing device disclosed in patent publication 1 it is difficult to locate movies and still images in accordance with the photographer's preference.

SUMMARY OF THE INVENTION

The present invention provides an imaging apparatus and imaging methods that are capable of easily acquiring a movie in accordance with the photographer's preference.

An imaging apparatus of a first aspect of the present invention comprises, an image sensor that acquires a plurality of images by repeatedly shooting an object, a temporary storage memory that stores images that have been acquired by the image sensor, a first operation member that selects a specified image from the image sensor at a specified first timing, a second operation member that selects an image at a second timing, which is after a shooting operation, from among images that have been stored in the temporary storage memory as a result of a selection operation by a photographer, and an image storage memory that stores a movie that has been generated based on a group of images that have been selected using the first operation member and/or the second operation member, from among a plurality of images that have been stored in the temporary storage memory.

An imaging apparatus of a second aspect of the present invention comprises, an image sensor that acquires a plurality of images by repeatedly shooting an object at a first timing, a memory that stores the plurality of images, and a controller that has a second selection section that selects images at a second timing from among images stored in the memory, and a movie candidate section that determines movie candidate frames from among the plurality of images in accordance with comparison results of images that have been selected or not selected at the second timing.

An imaging method of a third aspect of the present invention comprises, acquiring a plurality of images by repeatedly shooting an object at a first timing, temporarily storing the plurality of images, performing second selection to select images at a second timing from among temporarily stored images, and determining movie candidate frames from among the plurality of images in accordance with comparison results of images that have been selected or not selected at the second timing.

BRIEF DESCRIPTION OF THE DRAWINGS

FIG. 3A and FIG. 3B are flowcharts showing camera comparison and determination operation of one embodiment of the present invention.

DETAILED DESCRIPTION OF THE PREFERRED EMBODIMENTS

An example where a digital camera (hereafter simply called "camera") is adopted as one embodiment of the present invention will be described in the following. This camera has an imaging section, with a subject image being converted to image data by this imaging section, and the subject image being subjected to live view display on a display section arranged on the rear surface of the camera body based on this converted image data. A photographer determines composition and photo opportunity by looking at the live view display. At the time of a release operation image data is stored in a storage medium. Image data that has been stored in the storage medium can be played back and displayed on the display section if playback mode is selected.

Also, when performing live view display with this camera on a display section, image data for every sequence of frames is stored in temporary memory. Image data that exceeds a predetermined storage capacity is sequentially deleted. Also, after having taken a still image when a release operation was performed, for a given time, image data from an imaging section is temporarily stored in the temporary storage section every time it is output (refer, for example, to S31 in FIG. 4A). Images that have been taken at the time of a release operation, images that have been temporarily stored before still image shooting, and images after still image shooting, are subjected to list display or sequentially display on the display section (refer, for example, to S43 in FIG. 4B).

A release operation (also commonly referred to as a "shutter release operation") is an operation where overall determination results for image conditions and timing conditions have been summarized, and is an operation that has high integrity as a user interface and high user satisfaction. That is, since the release operation is a manual user operation, the imaging and timing conditions are assumed to closely reflect the user's intention. That is, the release operation is assumed to reflect the user's intentions. The release operation is an operation that is performed while aiming at an object to be shot, and is an image selection method with which there is a high possibility of capturing an image of an object within a screen stably, and for reading the user's intention or objective of shooting by analogy from timing and image information. For this reason the release operation may be called a first operation, or a first selection. Selection need not only be by user operation of a release button, and the same image selection is also possible using motion, gesture or voice operations by a user. Accordingly, the first operation or first selection is not limited to a shutter release operation.

Figure 4A:
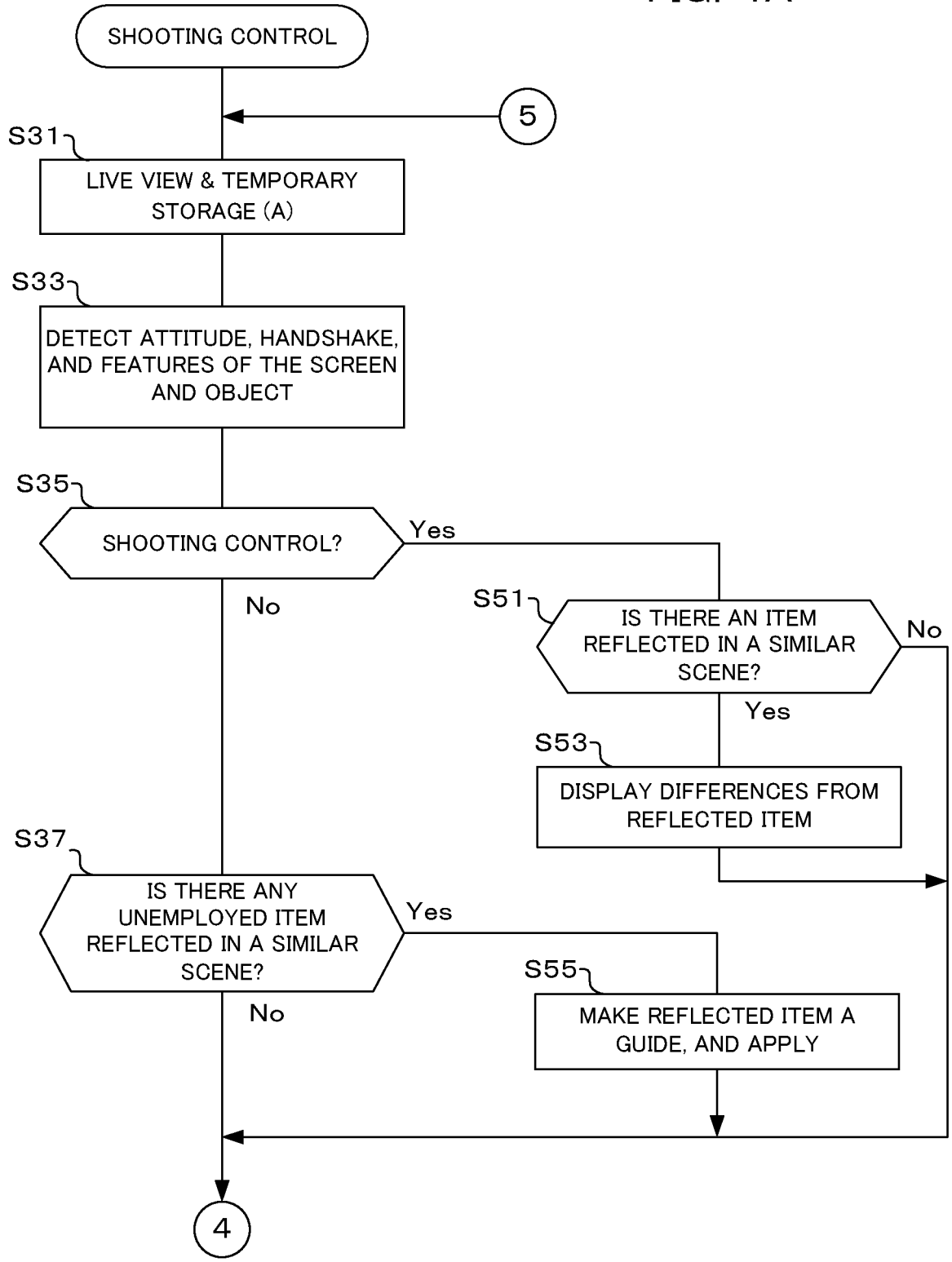
FIG. 4A and FIG. 4B are flowcharts showing a shooting control operation of the camera of one embodiment of the present invention.
Figure 4B:
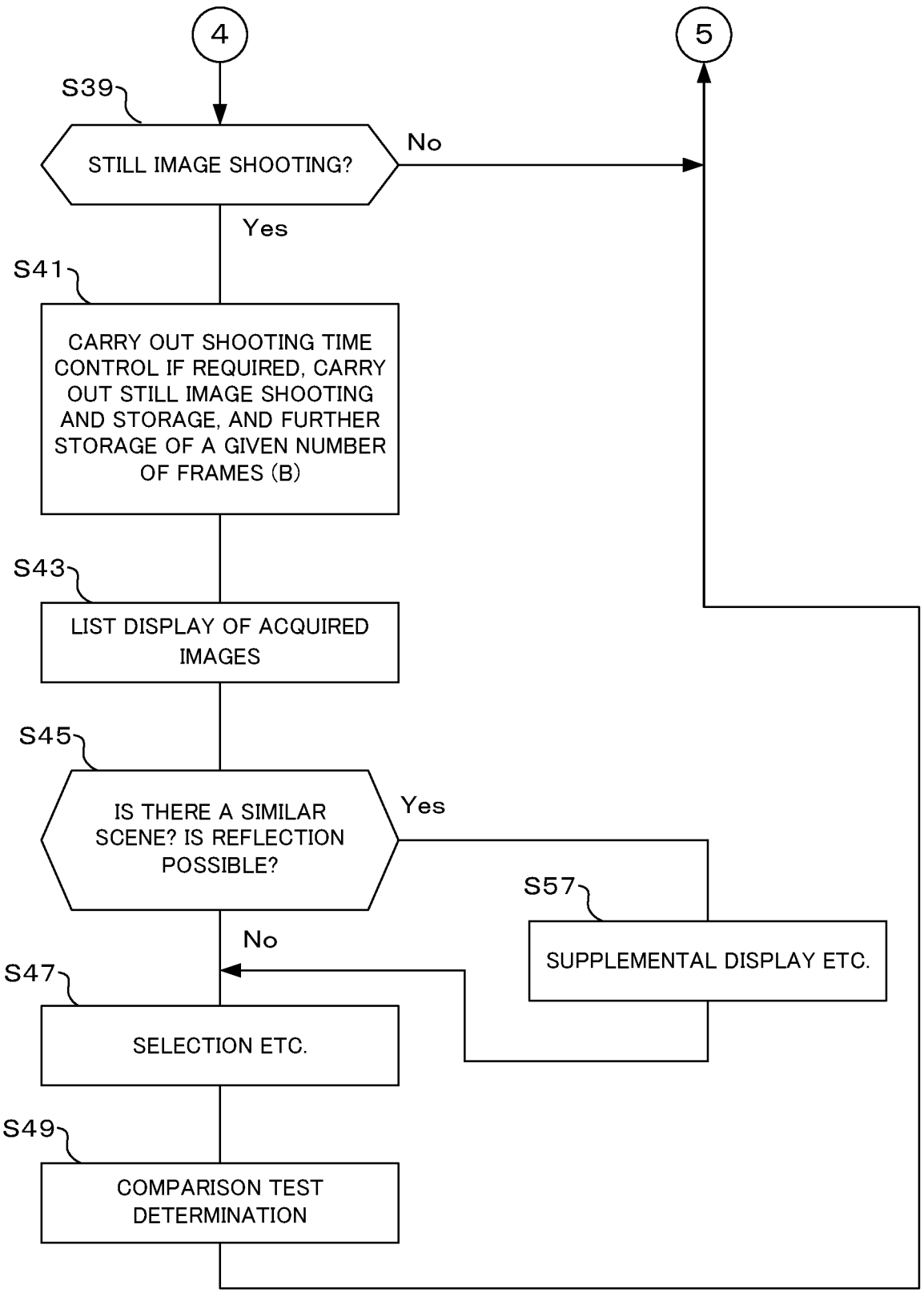

If list display or the like is performed on the display section, the photographer can designate an image that reflects their intention (prefer to S47 in FIG. 4B). In this case, the displayed image designated by the user is stored as a second selection, and an image that was taken at the time of a release operation is stored as a first selection (for example, S41 in FIG. 4B).

The release operation itself is simple for a person to understand, and to become familiar with. Indeed, a release operation has been traditionally performed by camera users. This release operation can also be said to be an operation that anybody can perform, but promptness is required with respect to conditions that change moment by moment, and then there may sometimes be failures in quickly deciding on a desired timing and composition. There are therefore cases where it is desirable to use selection at a time that does not require immediacy (second selection). With the second selection, the user can examine and choose from specific samples.

The camera has a learning function, and learns images that the photographer has a preference for based on shooting conditions at the time of shooting images that have been the subject of first selection and second selection, and based on image composition etc. (refer, for example, to S49 in FIG. 4B and to FIG. 3A and FIG. 3B). This learning function is not limited to the camera itself, and may also be performed on an external device, and may also be specified to be performed by connecting to an external device using a communication section, not illustrated. Also, the photographers movie preferences are learned based on change in composition and background conditions, etc., based on image data of still images that have been taken sequentially during live view display (refer, for example, to S19 and S21 in FIG. 3A, and S23 in FIG. 3B).

As a learning function, a simple approach is to analyze differences between selected images and non-selected images using images that have been selected (either one frame or two frames may suffice, but when contributing to any kind of contest or the like, the best image is selected) and images that have not been selected. Specifically, since the user performs some sort of determination at the time of selecting a still image, it becomes possible to learn still image selection by using this user-based selection. Machine learning, for example, deep learning, may also be used as a learning function. Machine learning may be accomplished by known techniques, including artificial intelligence techniques. In deep learning, a large amount of images are used as training data. With this embodiment, there is the advantage that a lot of training data is acquired, including relationships such as, for example, which is good data and which is not good data. The reasons for that image being selected can be analyzed in detail based on differences between selected images and non-selected images in terms of focus, composition, brightness, expressions, directions of our eyes and faces, whether or not light has entered pupils, etc. Also, a process until a photo image is acquired, and a final image acquired through the process, are stored. Further, an image group acquired through that process has drama, a story, and also has a high quality as a movie at the time of continuous playback.

Also, inputs to an image learning model may be images themselves or may be image feature amounts, and it is also possible to learn relationships such as whether these images and image feature amounts have artistic value. A learning model may be a still image learning model and a movie learning model, where a still image learning model learns relationships between selected images and non-selected images, while a movie learning model is a model that learns relationships such as it being possible to identify whether continuity of a series of images is good or bad. These learning and inference models may also be the result of deep learning using the previously described training image data. With still image selection inference, results of having performed learning such as being able to discriminate between an image that the user has selected and an image the user has not selected may be considered to be a still image selection inference model. With movie selection inference, a result of having performed learning such as being able to discriminate a smooth movie and a movie that is jumpy is made a movie selection inference model. Smooth movies and movies that are not smooth may be learned in advance, or learning may be performed taking into consideration the user's preference.

Figure 3A:
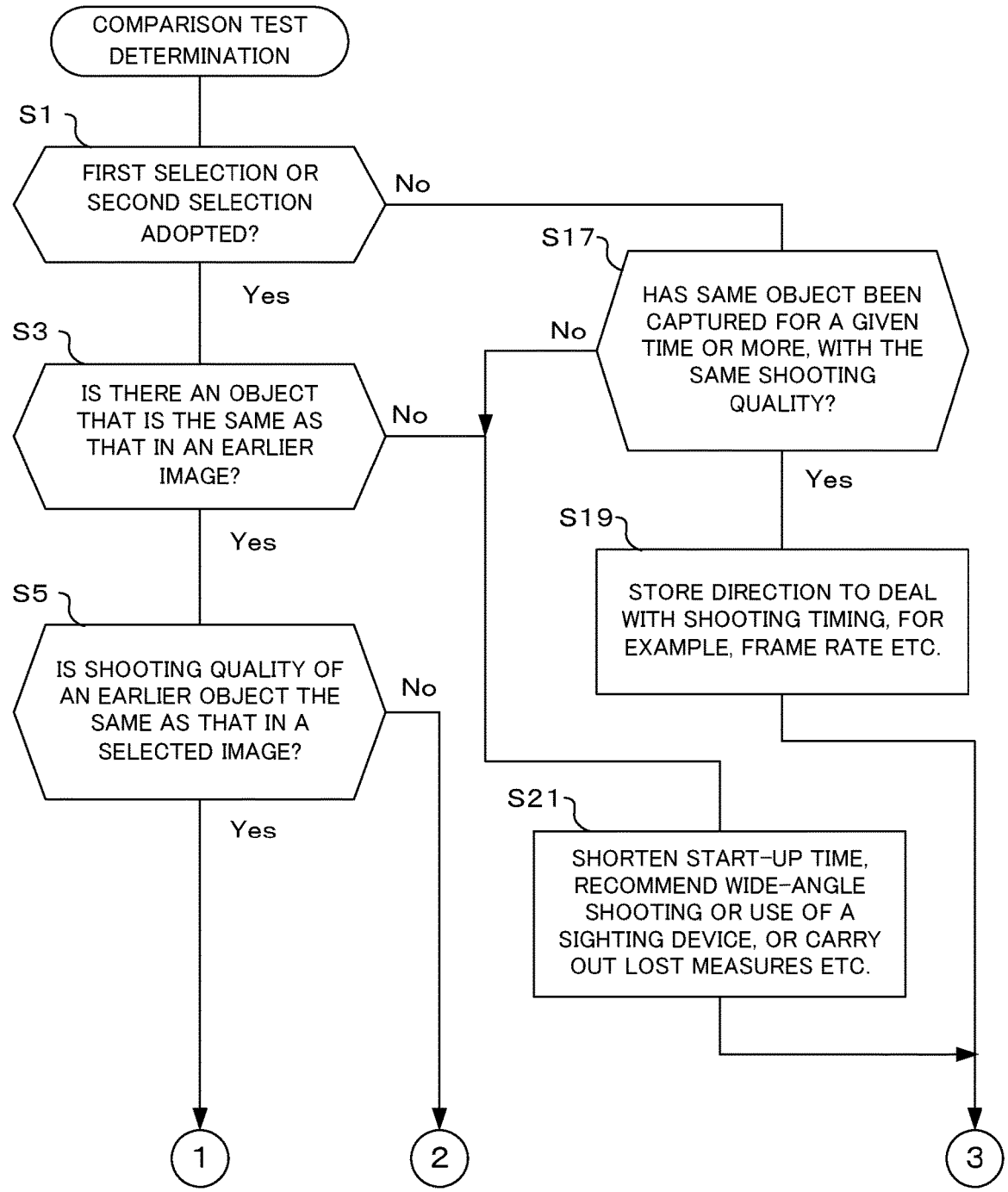

It is possible to determine the user's intention from user selected images, and since a series of images that have been temporarily stored before and after a time when an image having high integrity was acquired is considered to be an image that imparts movement to an image of high integrity, in the event that these images are suitable as a movie, a movie is generated and stored (refer, for example, to S7 and S9 in FIG. 3B). Whether or not these images are suitable may be determined utilizing deep learning where a lot of movies are learned, but there is also a method of simply determining suitability from composition using a process such as shown in FIG. 3A. Also, images that the photographer has a preference for are displayed at the time of shooting based on learning results at the time of selecting a still image (refer, for example, to S51 and S55 in FIG. 4A).

Figure 1:
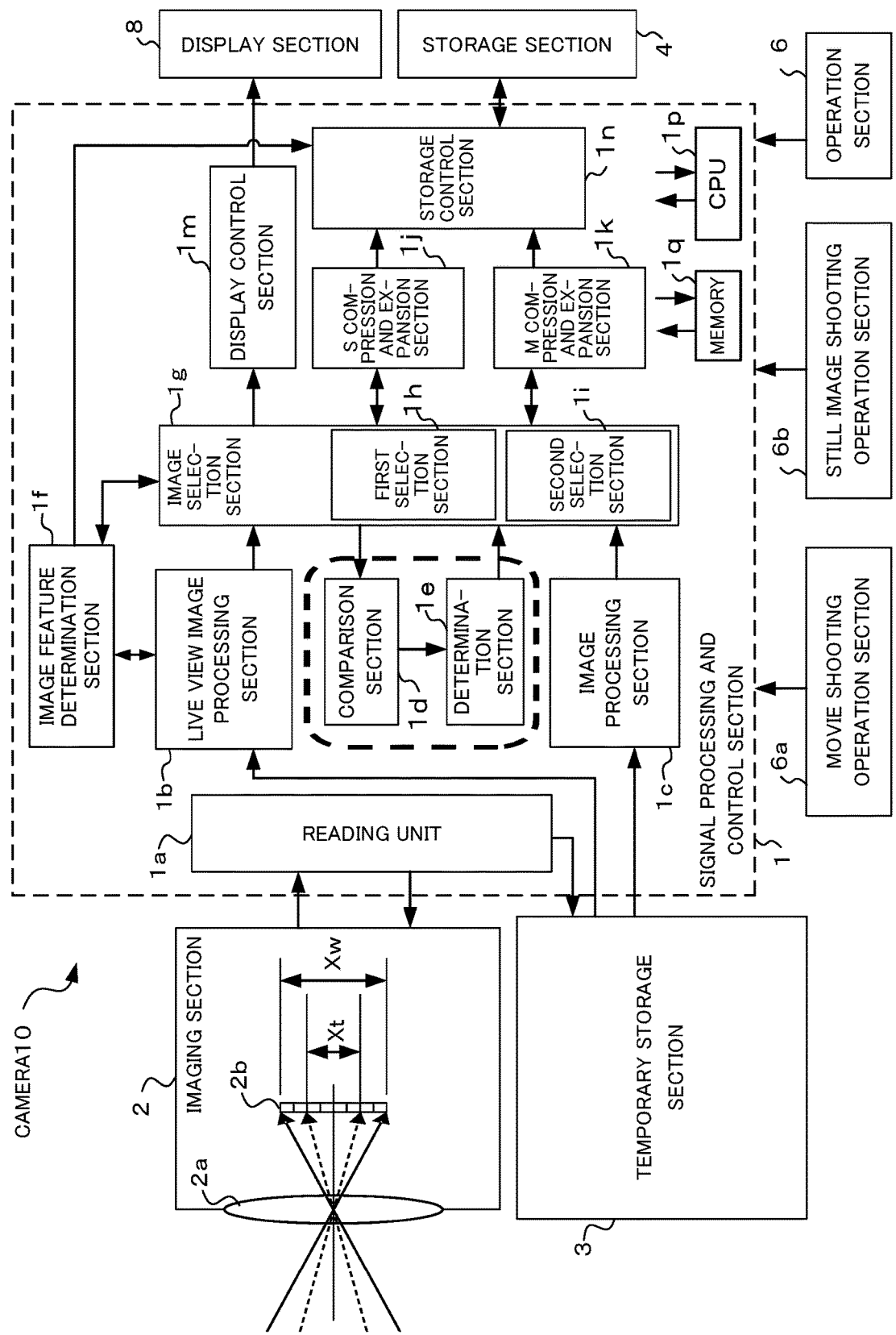
FIG. 1 is a block diagram mainly showing the electrical structure of a camera of one embodiment of the present invention.

Next, the camera 10 of one embodiment of the present invention will be described using FIG. 1. This camera 10 has a signal processing and control section 1, an imaging section 2, a temporary storage section 3, a storage section 4, an operation section 6, a movie shooting operation section 6a, a still image shooting section 6b, and a display section 8.

The imaging section 2 has a photographing lens 2a and an image sensor 2b. The photographing lens 2a forms a subject image on the image sensor 2b. The image sensor 2b subjects a subject image to photoelectric conversion, reads out a pixel signal using a reading unit 1a, and outputs as image data. When the reading unit 1a reads out the pixel signal, it is possible to arbitrarily set read out ranges Xt, Xw. A readout range Xt corresponds to a telephoto range (long focal distance), while the readout range Xw corresponds to a wide-angle range (short focal distance). It is possible to appropriately change these readout ranges, and in this way it is possible to perform an electronic zoom operation, and it becomes possible to change angle of view.

The image sensor 2b functions as an image sensor that acquires a plurality of images by repeatedly shooting an object at a first timing. The first timing is a given period before and after instruction to acquire a still image. For example, if the instruction to acquire a still image is a full press of a camera's shutter release button, images may be repeatedly captured (with possible overwriting of older images) while the shutter release button is half-pressed. Also, a specified first timing is within a period of the first timing, and is timing in which shooting instruction has been performed in order to shoot a still image. It should be noted that the specified first timing is not limited to a shooting instruction in order to acquire a still image (normally, at the time of a release button operation) and may also be a time for performing shooting instruction under given conditions, and is not limited to a single time, and may be a plurality of times.

It should be noted that the reading unit 1a extracts a pixel signal corresponding to the readout ranges Xt and Xw, after reading out all pixel signals, and may output image data based on this extracted pixel signal. Also, when changing angle of view, and optical zoom function may be provided instead of the electronic zoom function, and also an electronic zoom function and an optical zoom function may both be used.

The temporary storage section 3 has a volatile or a non-volatile memory for temporary storage, and can sequentially store image data of a given number of frames that have the output from the image sensor 2b during live view display. If a given number of frames is exceeded, image data is sequentially deleted from the oldest image data, and the newest image data is temporarily stored. Image data that has been temporarily stored during live view display is output to a live view image processing section 1b, and image data that has been temporarily stored at the time of still image shooting (time of actual shooting) is output to an image processing section 1c. The temporary storage section 3 functions as a memory for temporary storage that temporarily stores images that have been acquired by the image sensor. Images that have been selected by the second selection section are stored in memory.

It should be noted, regarding capacity for image data of a single frame at the time of live view display and at the time of still image shooting, that the image data at the time of shooting a still picture is greater than the image data at the time of live view display. However, as will be described later, since there are cases where image data at the time of live view display is ultimately stored in the storage section 4, capacity for both types of image data may be made the same.

Within the signal processing and control section 1 there are provided, as well as the previously described reading unit 1a, the live view image processing section 1b, image processing section 1c, comparison section 1d, determination section 1e, image feature determination section 1f, image selection section 1g, first selection section 1h, second selection section 1i, still image (S) compression and expansion section 1j, movie (M) compression and expansion section 1k, display control section 1m, storage control section 1n, CPU (central processing unit) 1p, and memory 1q. The signal processing and control section 1 has an ASIC (Application Specific Integrated Circuit) that includes a CPU and peripheral circuits of the CPU, and is a controller for the camera 10.

The reading unit 1a includes an image processing circuit, and performs accumulation control and readout control of pixel signals of the image sensor 2b. At the time of live view display, pixel signals are read out from the image sensor 2b at a given frame rate (for example, 30 fps, 60 fps, 120 fps etc.), and image data is output to the temporary storage section 3. Also, if a release operation is performed, still image shooting (actual shooting) is performed. At the time of still image shooting, exposure control is performed in accordance with exposure conditions that have been set automatically or manually, pixel signals are read out once exposure control has been completed, and image data is output to the temporary storage section 3. It should be noted that image data that has been acquired at the time of still image shooting may also be output directly to the image processing section 1c.

A live view image processing section 1b has an image processing circuit for live view display. The live view image processing section 1b is provided with, as input, image data for the most recent single frame that has been temporarily stored in the temporary storage section 3, performs various image processing such as contrast and color correction for live view display, and outputs to the image selection section 1g.

The image processing section 1c has an image processing circuit for actual shooting. The image processing section 1c is input with image data of a still image that was acquired at the time of the release operation (at the time of actual shooting) from the temporary storage section 3, performs various image processing such as contrast and color correction for storage (and for Quickview display), and outputs to the image selection section 1g.

It should be noted that image processing in the live view image processing section 1b and in the image processing section 1c is not limited to processing such as contrast and color correction, and various image processing such as exposure correction and noise processing, WB gain correction, edge enhancement, false color correction, etc., are performed according to use of an image.

The image feature determination section 1f is provided with, as input, image data for live view from the live view image processing section 1b, and is also input with selection results of the image selection section 1g, and acquires feature information that is useful in determining what the photographer has a preference for, such as features of an object and features of an image, for example, timing, composition, shapes, focus, exposure (amount of offset from optimum exposure amount), whether or not there are faces, whether or not there are portions of an screen that protrude, color distribution, etc. (refer to S33 in FIG. 4A). Features of an image that have been determined by this image feature determination section 1f are output to the image selection section 1g and the storage control section 1n. The image feature determination section 1f also acquires camera attitude, camera shake conditions, focal length information using electronic zoom, etc., and various information, in association with each item of image data.

These items of feature information that have been acquired are stored in the memory 1q, temporary storage section 3, and storage section 4, in association with an image. Feature information that has been detected during live view display is stored in the temporary storage section 3, together with image data. Also, together with image data that is finally stored in the storage section 4, feature information relating to this image data stored. Also, results of learning and feature information that has been acquired are accumulated and stored in the memory 1q so that it can be easily used at the time of shooting. It should be noted that storage location of feature information is not limited to the above-described temporary storage section 3 and storage section 4, and may be another storage section, and also storage of some information may be omitted. The image feature determination section 1f functions as an image feature determination section that determines features of an object based on images that have been acquired by the imaging section.

The image selection section 1g determines whether any image has been the subject of first selection or the subject of second selection. The first selection section 1h selects image data at the time of still image shooting (actual shooting) when the photographer has performed a release operation, and selects image data at this time and image features at this time. The first selection section 1h functions as a first selection section that selects an image at a specified first timing, within a first timing. Also, a member for a release operation, such as a release button, functions as a first operation member that selects a specified image from the image sensor at the specified first timing. This first operation member is not limited to a release button and may also be a touch panel, or the like, capable of a release operation. The specified first timing within the first timing is a time at which acquisition of a still image is instructed.

The above-mentioned first timing is not limited to being a particular point in time, and corresponds to a given period for performing live view display, etc., for the purpose of still image shooting. This first timing can probably not always adapt to shooting, but it can be said to be timing of determination after confirming various elements, since until at least that moment, or immediately prior, the user selects responsively while looking at effects such as change in movement of composition of an object, or results of adjustment of shooting parameters, etc. Since information in which these types of elements are integrated is included, the first timing can be considered to include extremely effective information for selecting an image.

Also, the first timing is not limited to a given period and may instead be called a time at which to try to perform shooting, and it can be considered that an object that was captured and stored on a screen at that time (or immediately prior to that) is what the user wanted to shoot, or alternatively, is an image constituting an image quality such as composition, shape, attitude, focus, exposure, etc., that the user likes. In this way, behavior and results selected by the user at this time can be considered effective taste information of the user. However, it is not always necessary to perform an operation at this first timing, and operation may also be in such a way so as to select while looking at an image for a specified time at a second timing, which will be described later.

Also, after still image shooting, the second selection section 1i selects an image that has been selected by the photographer using touch operation or the like, when images that have been temporarily stored before and after still image shooting have been subjected to list display (refer to S43 in FIG. 4B and also to FIG. 5A and FIG. 5B), and selects image data at this time and image features at this time. The second selection section 1i functions as a second selection section that selects an image at a second timing, from among images that have been stored in the storage section. The second timing is a time at which, after still image acquisition, an image that will be finally stored in the storage section is selected from among a plurality of images that have been acquired using the imaging section. Also, a touch panel functions has a second operation member that selects an image at a second timing, which is after a shooting operation, from among images that have been stored in the memory for temporary storage as a result of a selection operation by a photographer. It should be noted that the second operation member is not limited to a touch panel, and it may also be an operation member such as a cross shaped button for moving a cursor on the display section 8.

The above described second timing is a time after the first timing, and is after shooting, namely after actions to capture an image for an object at a crucial moment. There may be a possibility for the user to choose their own preferable image by comparing a plurality of images slowly, or confirming each image thoroughly, which facilitates reflection of the user's intention. An image that can be selected at this time need not be only a single image. Obviously a person other than the user or a computer etc. may perform selection using appropriate evaluation criteria, but even in such a case it can be considered to be a chance to compare and select a series of a plurality of obtained images, making it an effective time.

That is, the second timing may be called a time at which it is possible to compare acquired images in a specified time range (specifically, before shooting, after shooting, or before and after shooting) with each other. Alternatively, it can be considered making a choice, and images that have not been selected here are considered to be those that the user does not have a preference for, while images that have been selected can be considered to constitute image qualities the user does have preference for, such as composition, shapes, attitude, focus and exposure. In this way actions and results of selecting and not selecting at this time can be considered to be effective user preference information.

The comparison section 1d compares an image that was selected by the first selection section 1h and an image that was selected by the second selection section 1i, and determines differences between the two (refer to S13 and S15 in FIG. 3B). Specifically, an image that was selected by the first selection section 1h is an image at the time of a release operation (the time of actual exposure), and in the event that there was a release operation it can be said to be a result of processes having been summarized up to that operation is reached. On the other hand, an image that was selected by the second selection section 1i is an image that conforms most closely to the photographer's taste, among images before and after actual exposure (this may be before and after, or may be a series of movies captured automatically without a shooting operation).

Features of both images are analyzed by the comparison section 1d, and by performing a comparison, it is possible to learn the preferences of the photographer. The learning here does not need to be deep learning, etc., where high level artificial intelligence is performed, and it is also sufficient to be able to perform determination later, from results of having stored numerical parameters, such as position, shape and color of a subject, exposure, focus, etc.

The comparison section 1d also performs comparison of images that have been selected by the first selection section 1h and the second selection section 1i with images that have not been selected (refer to steps S13 and S15 in FIG. 3B). As a result of these comparisons it is possible to learn whether a series of images conforms to the photographer's preference, and this can be used when storing a movie (S7 and S9 in FIG. 3B).

The determination section 1e determines whether or not movie image data will be generated using image data of a given number of frames that have been temporarily stored in the temporary storage section 3 (refer to S7 in FIG. 3B). The determination section 1e, also learns images that the photographer has a preference for based on comparison results from the comparison section 1d (refer, for example, to S13 and S15 in FIG. 3B). Also, using learning results, a shooting guide (reflected item) is displayed at the time of shooting (S53 and S55 in FIG. 4A, and S57 in FIG. 4B). The comparison section 1d and the determination section 1e, function as an image group information learned section that learns information about a specified image group from a plurality of images that have been stored in the storage section, in accordance with comparison results for images that have been selected or have not been selected at the first and second timings (or either one of them).

This image group information learning section learns information about a specified image group, from a plurality of images, based on features of an object that have been determined by the image feature determination section. Also, when an image has not been selected by the first selection section and/or the second selection section, in the event that an object of the same shooting quality as for shooting using the image sensor has been captured, the image group information learning section stores countermeasures for shooting timing (refer, for example, to S17 and S19 in FIG. 3A).

The image group information learning section stores lost countermeasures in the event that, when images have been selected by the first selection section and/or the second selection section, an image of an object that is the same as an object of a selected image has not been acquired, or in the event that an image has not been selected by the first selection section and the second selection section, and an object having the same shooting quality as for shooting using the imaging section has not been captured (refer, for example, to S3-S21 and S17-S21 in FIG. 3A).

When an image has been selected by the first selection section 1h and/or the second selection section 1i, if an image of an object that is the same as the object of a selected image has been acquired, but it is not of the same shooting quality as shooting using the image sensor, the image group information learning section performs guidance for changing shooting control (refer, for example, to S5→S23 in FIG. 3A and FIG. 3B).

The display control section 1m includes a display control circuit, and displays images that have been selected by the image selection section 1g. Specifically, at the time of live view display, image data for live view display is output to the display section 8 on the basis of image data that has been subjected to image data image processing by the temporary storage section 3 and the live view image processing section 1b (S31 in FIG. 4A). Also, when a release operation has been performed and a still image has been taken, images of a given number of frames during live view display and an image at the time of still image are subjected to list display (referred to S43 in FIG. 4B). It should be noted that at the time of list display, images that have been selected by the photographer are recognized in the second selection section 1i as second images.

The S compression and expansion section 1j has an image compression circuit and an image expansion circuit for still images. At the time of shooting, the S compression and expansion section 1j performs compression processing for storage of image data of still images that have been selected by the image selection section 1g. Also, at the time of playback, expansion of image data of still images that are stored in the storage section 4 is performed. Image data that has been expanded is displayed on the display section 8 by means of the display control section 1m.

The M compression and expansion section 1k has an image compression circuit and an image expansion circuit for movies. At the time of shooting, the M compression and expansion section 1k performs compression processing for storage on image data of movies that have been selected by the image selection section 1g. Also, at the time of playback, expansion of image data of movies that are stored in the storage section 4 is performed. Image data that has been expanded is displayed on the display section 8 by means of the display control section 1m.

The storage control section 1n performs control when storing image data that has been compressed by the S compression and expansion section 1j or by the M compression and expansion section 1k in the storage section 4. The storage control section 1n also performs readout control of image data from the storage section 4 at the time of playback.

The memory 1q is a volatile memory and a non-volatile memory, and, as well as storing the previously described programs, is used for various applications, such as data for adjustments of the camera 10, secondary storage memory for processing etc.

The CPU 1p is an overall controller for the camera 10, and performs overall control of the camera 10 in accordance with programs stored in the memory 1q. Some or all of the functions of each of the sections, such as the previously described comparison section 1d, determination section 1e, image selection section 1g, and image feature determination section if are implemented using the CPU 1p. Specifically, although FIG. 1 shows the comparison section 1d, determination section 1e, image selection section 1g and image feature determination section if as being separate from the CPU 1p, some or all of these sections may be implemented by the CPU 1p and programs. The controller may also have hardware circuits for implementing the functions of each section.

The CPU 1p functions as a movie candidate section that determines movie candidate frames from a plurality of images, in accordance with comparison results for images that have been selected or not selected at the second timing (refer, for example, to S1-S7 in FIG. 3A and FIG. 3B). The movie candidate section determines movie candidate frames when images have been selected in at least one selection section of the first selection section and the second selection section (refer, for example, to S1 in FIG. 3A). The movie candidate section determines movie candidate frames in the event that a plurality of images have the same object over a given period (refer, for example, to S3 in FIG. 3A). The movie candidate section determines movie candidate frames in the event that shooting quality of plurality is the same over a given period (refer, for example, to S5 in FIG. 3A).

In a shooting preparation state, the movie candidate section determines movie candidate frames from among a plurality of images in the event that images that have been acquired by the imaging section are images of similar scenes to those that were acquired previously, on the basis of information stored in the storage section. Also, display of shooting control based on information that has been acquired using learning, or automatic shooting control, is implemented (refer, for example, to S53 and S55 in FIG. 4A). Also, the CPU 1p displays differences between recommended shooting control at the time of images of similar scenes, and shooting control that is currently set, on a display (refer, for example, to S53 in FIG. 4A). Also, when images have been selected by the first selection section or the second selection section, the CPU 1p stores a movie based on images that have been stored in the temporary storage memory in the event that at least either an object that is the same as in a selected image has been obtained, or there is the same shooting quality as in a selected image (for example, S7 and S9 in FIG. 3B).

The display section 8 has a panel for enlarged display that is provided on a rear surface of the body of the camera 10, and an electronic viewfinder (EVS) for observing a display panel by means of an eyepiece, etc. As well as the previously described live view display and list display at the time of still image shooting, this display section 8 performs various display such as shooting guidance during live view display, display screens etc.

The movie shooting operation section 6a has a movie button for movie shooting instruction etc., and the movie shooting operation section 6a is operated when the user commences shooting of a movie. When the movie shooting operation section 6a has been operated, the signal processing and control section 1 stores image data based on image signals that have been acquired by the image sensor 2b in the storage section 4 after having been subjected to image processing by the image processing section 1c and the M compression and expansion section 1k.

The still image shooting section 6b has a release button for still image shooting instruction, and the release button is operated when the photographer performs shooting of a still image. When the still image shooting operation section 6b has been operated, the signal processing and control section 1 stores image data based on image signals that have been acquired by the image sensor 2b in the storage section 4 after having been subjected to image processing by the image processing section 1c and the S compression and expansion section 1j. Also, as was described previously, list display of images that have been acquired before and after still image shooting is also performed.

The operation section 6 includes operation members such as various switches, various buttons, and an operation dial, and is operated by the photographer. A touch panel may also be provided on the display panel of the display section 8. In this case, at the time of list display for still image shooting, images that are in line with the photographer's preference can be designated by performing a touch operation.

The storage section 4 has a non-volatile and electrically rewritable memory such as flash memory, and is a storage medium that can be fitted into the camera body 10. Image data of still images and movies are stored in this storage section 4 by the storage control section 1n. The storage section 4 functions as an image memory that stores movies that have been generated on the basis of images that have been stored in the temporary storage memory, when images that have been selected by the first selection section and/or the second selection section, and images that have been temporarily stored in the temporary storage memory satisfy given conditions. The storage section 4 functions as a memory for storing images that have been selected by the second selection section. The storage section 4 also functions as an image storage memory that stores a movie that has been generated based on a group of images that have been selected using the first operation member and/or the second operation member, from among a plurality of images that have been stored in the temporary storage memory. Also, the storage section 4 and/or the temporary storage section 3 function as memory for storing a plurality of images. This storage section stores information that has been learned by the image group information learning section. It should be noted that information that has been learned is not limited to being stored in the temporary storage section 3 and/or storage section 4, and may also be stored on an external server that is capable of being connected to via the Internet etc.

Figure 2:
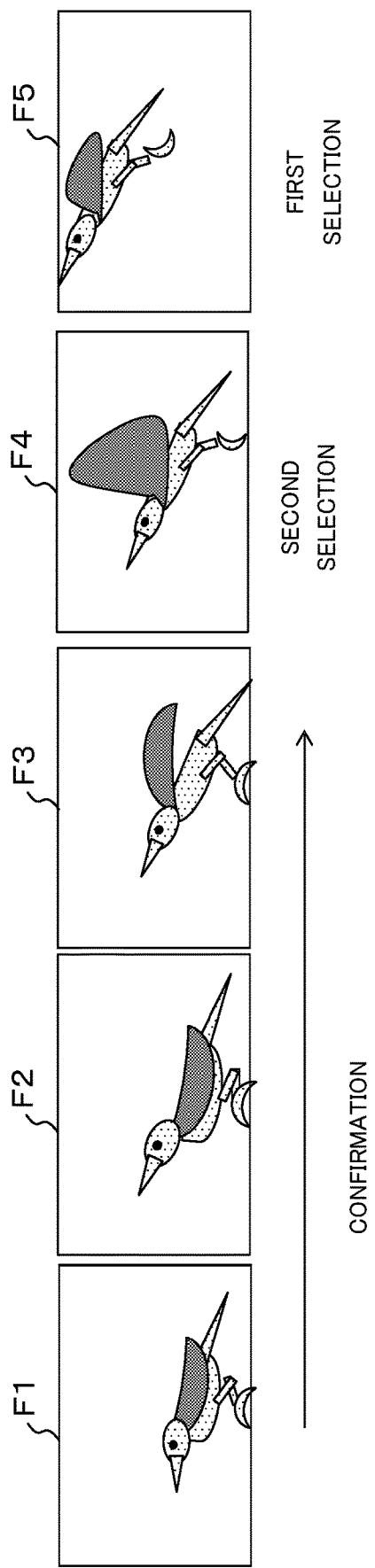
FIG. 2 is a drawing showing examples of images that have been continuously taken by a camera of one embodiment of the present invention.

Next, images that have been temporarily stored, in the camera of this embodiment, will be described using FIG. 2. FIG. 2 shows images that have been temporarily stored or taken as still images when a bird takes off. At the time that the bird takes off speed is fast and it is difficult for the photographer to shoot in the way they want to. For example, even if the photographer wishes to shoot an image such as is shown by image F4 in FIG. 2 and tries to operate the release button at the time of image F4, as a result of response delay the release operation (first time) will often be performed at the time of image F5.

In order to be able to shoot image F4 even under such conditions, shooting is repeated from a time before release (for example, at the time of image F1) and images are temporarily stored. Then after shooting, the frame for image F4 is selected by the user and a temporarily stored image may be made an actually stored image.

Also, when the images F1 to F5 have been subjected to list display, there may be cases where there are no images that suit the preference of the photographer, such as the image F4 shown in FIG. 2. Specifically, there may be cases where even the frame at the time of image F4 may not be selected because it does not suit the user's preference because of a problem at the object side (subject side) (flapping wings in the case of a bird, or pose or expression if it is a person), a problem at the photographer side (exposure, focus, angle of view), or problems related to both the object and the photographer (protruding from the screen, or bad composition) etc. In this case, the selection operation is completed with none of the images being stored.

In this way, user selection of a frame at image F4 (second selection) includes various information. That is, the fact that image F4 is preferred over image F5, and a series of images (images F1-F3), is considered to be preparation for shooting this instant (instant corresponding to image F4).

Also, in a case where no images have been selected, it is perceived that a result of first selection was satisfied, or some things were unsatisfactory in images F1-F4 rather than being satisfied with first selection (image F5), which makes it possible to infer the photographer's preference. In this case it is possible that there was a problem with focus, exposure, or zoom position, but since there was already confirmation by the user with images F1 to F3, it will be understood that the point of dissatisfaction is unexpected change from that point on. Alternatively, if shooting were possible between image F3 and image F4, it might also be considered that this image would be best. It is possible to deal with this case by raising the imaging frame rate.

It should be noted that in FIG. 2, description has been given with a example where images before release are temporarily stored, but is also possible to similarly perform rapid shooting after release, and then perform temporary storage and perform similar selection. It is also perfectly possible to perform rapid shooting both before and after still image shooting, perform rapid shooting, and perform similar selection.

Next, comparison test determination operation will be described using the flowcharts shown in FIG. 3A and FIG. 3B. In this flow, determination and learning of the photographer's preferences are performed by comparing images. This operation is mainly performed in the comparison section 1d and determination section 1e, but for all practical purposes, this operation is implemented by the CPU 1p in accordance with programs that have been stored in the memory 1q. Various contrivances have been incorporated into this flow, and so it is possible to achieve the characteristic effects of this invention even if some steps are omitted from the flow. For example, in a step that compares a first image and a second image, in the event that these items of information do not exist it is possible to advance to the next step without performing comparison.

If the flow for comparison test determination is entered, it is first determined whether or not first selection or second selection have been adopted (S1). After completion of still image shooting, a still image and a series of images that have been acquired before and/or after still image shooting are subjected to list display (S43 in FIG. 4B), and the photographer selects a final storage image to be set aside as a storage image in the storage section 4, for example, by performing a touch operation on that image. In this step it is determined whether either of a first selection (refer to F5 in FIG. 2, image that has been taken using a release operation) or a second selection (refer to F4 in FIG. 2) has been adopted for an image as a final image. It should be noted that in a case where still image shooting has been performed as a result of a release operation, the image becomes that of the first selection as it conforms to the user's intention, but in the case of still image shooting using automatic shooting, the image does not become that of the first selection since the user's intention is not known in the absence of a manual release operation. Also, in a case where a final storage image was not selected from among a plurality of candidate images displayed using a touch operation or the like, no second selection will exist.

If the result of determination in step S1 is that first selection or second selection have been adopted, it is determined whether or not an object (in the selected image) is the same as that in images have been taken (viewed) a short while earlier (for example, one sec, that is, within a predetermined time period, or time span which the photographer can confirm the quality of the object image) (S3). When shooting still images, the photographer generally decides upon a subject while looking at a live view display, and performs shooting so as to achieve the intended composition, etc. In this step (S3), it is determined whether or not the same subject has been aimed at and viewed for some time. It should be noted that "for some time (short while)" may be a time in which it can be considered that the user has observed, confirmed and attempted to aim at an object for shooting over a given time.

If the result of determination in step S3 is that an object (in the selected image) is the same as that in images have been taken (viewed) a short while earlier, it is determined whether or not shooting quality of an object in earlier images is the same as that in a selected image (S5). Shooting quality is, for example, focus, exposure, or angle of view etc., and is a control element that affects the quality of a taken image. In this step it is determined whether or not an image of a first or second selection has been taken without change in shooting quality for substantially the same length of time as that of used in the determination of step S3. It should be noted that in this step, determination is made with the condition of whether it is "the same as an earlier image" or not. This is because it is supposed to be well observed and confirmed by the user using live view. There are significant differences between a case such as having performed shooting upon the user being satisfied with confirmation and adjustments, and a situation where adjustment has not been fully performed but the object happens to be nicely photographed by chance. Specifically, there is meaning in obtaining satisfaction with an image by observation using live view display.

If the result of determination in step S5 is that shooting quality of an earlier object is the same as that of a selected image, next a selected image, and earlier and subsequent images, are stored as a movie (S7). From the determinations in steps S3 and S5, it will be understood that there are cases where the same object is photographed with the same shooting quality (live view display and still image shooting). These types of images are a case such as in FIG. 5A, which will be described later, and are high quality images as a movie. This series of images is then formed into a movie using the image processing section 1c and the M compression and expansion section 1k etc., and image data of the movie is stored. It should be noted that it is not always necessary to store images from either before or after the selected image.

In step S7, by the user simply selecting a single frame from a series of images that have been acquired, it is possible to obtain a high quality movie in which an intended object has been obtained at a good image quality, and as a result it is possible to reduce the burden on the user considerably. Consequently, the user can focus on simply obtaining a good still image, and can concentrate on switching various shooting parameters and confirming composition.

Once the movie storage has been performed in step S7, next object features and movie patterns are stored (S9). Here, for images that were stored as movies in step S7, image features that have been detected by the image feature determination section if are stored in the storage section 4, temporary storage section 3, or memory 1q. Therefore, together with image data of a stored movie, feature information relating to this image data is stored in the storage section 4. Also, results of learning and feature information that have been acquired are stored in the memory 1q so that they can be easily used when generating image data for a movie after accumulation. It should be noted that storage location of feature information is not limited to the above-described storage sections, and may be another storage section. Also, storage of some information may be omitted.

Also, patterns of a movie to be stored in step S9 may include, for example, object size, variation in object size, movement direction and movement speed, movement vectors representing change within the frame, etc. Also, for an animal such as a person or bird, a relationship between face size, orientation and movement direction, etc. can be digitalized for each of those items. For example, with the example shown in FIG. 5A, there is a pattern for the time when a bird takes flight, with the appearance of looking up at the sky, opening the wings, and flapping the wings, and this may be expressed as movement vectors, etc.

If features, etc., of an object have been stored, it is next determined whether or not second selection has been adopted (S11). With the example shown in FIG. 2, image F4 is the second selection. In this step, determination is not for image F5, which corresponds to a release operation, but rather for whether or not the photographer has selected image F4 for storage, which does not correspond to a release operation. If the result of this determination is that second selection has not been adopted, the originating flow (shown in FIG. 4B) is returned to.

On the other hand, if the result of determination in step S11 is that second selection has been adopted, differences between the first and second selection are determined (S13). Here, feature information (for example, time, composition, shape, focus, exposure etc.) of an image of the first selection (that is, the image corresponding to the time of release operation) and an image of the second selection (that is, the image that has been selected for storage by the photographer) are compared to determine differences.

If differences between the first selection and the second selection have been determined, next features of the object and "selected image differences" are stored (S15). Here, features of the object, which is the subject, and selected image differences that have been determined in step S13, are stored in the storage section 4, temporary storage section 3, or memory 1q, etc. With the examples shown in FIG. 2 and FIG. 5A, the fact that there is a "bird flying away" is stored, and the instant that the bird has spread its wings and taken off from a stationary position is stored as a "selected image difference."

By performing this type of storage in step S15, information regarding what kind of images the photographer likes is accumulated for every object, and learning is performed. As a result, it becomes possible for the camera to perform guidance in accordance with the photographer's preferences, and recommendations for storage image candidates, etc., for similar taken objects. Once storage has been performed the originating flow (S49 shown in FIG. 4B) is returned to.

Returning to step S1, if the result of determination in this step is that a first selection image or a second selection has not been adopted as a final storage image, it is determined whether or not the same object has been captured for a given time or more (that is, for at least a given time), with the same shooting quality (S17). In step S1, as was described previously, there may be situations where an image has not been selected by first selection or second selection. In this case, for example, if the same object (for example, a "bird" with the examples shown in FIG. 2, FIG. 5A and FIG. 5B) is a moving body, it is determined whether or not the photographer was following the subject so as to keep it within the shooting angle of view. Also, if the same object is a stationary body, it is determined whether or not other the camera has been swung from that object to another subject, etc. It should be noted that shooting quality is, for example, focus, exposure, angle of view, etc., as was described previously.

If the result of determination in step S17 is Yes, then a direction to deal with shooting timing, for example, frame rate, etc., is stored (S19). Despite the fact that the same object was being captured, in the event that neither first selection or second selection have been adopted, it is assumed to be a case where there is an image the photographer requires at a time between images that have been subjected to list display. Therefore, by increasing the frame rate the possibility of shooting an image that the photographer desires is increased, and information to that effect is stored in the storage section 4 and the memory 1q. Besides that, the fact that shooting timing is to be dealt with is stored. Once this storage has been performed, the originating flow (S49 shown in FIG. 4B) is returned to.

If the result of determination in step S17 is No, or if the result of determination in step S3 is No, the fact that start-up time is shortened, or that wide-angle shooting or use of a sighting device is recommended, or that lost measures (that is, measures taken to help ensure that a user does not lose track of an object intended to be photographed), etc. will be performed, is stored (S21). In the case where the process flow is S1 No→S17 No, the possibility that an object has not been captured within the shooting screen is increased, while in the case where the process flow is S1 Yes→S3 No, there is a high possibility that first or second selection has been unintentionally adopted, but an object has not been captured within the shooting screen before the selection. Then, the fact that lost measures will be performed, so that it is possible for the photographer to capture an object they want to photograph, by performing measures so as to be able to start up the camera rapidly, or by making it easy to find an object that has become lost by using wide-angle (short focal length) or a sighting device, is stored in the storage section 4 and the memory 1q. As measures for dealing with a lost object have been stored, the originating flow (S49 shown in FIG. 4B) is returned to.

Returning to step S5, if the result of determination in this step is No, focus, exposure, and/or angle of view, etc., are changed at the time of shooting, or guidance is performed prior to that change (S23). In this case, since there is a situation where selected image quality is better than image quality at the time of live view, shooting has likely been performed while still not fully satisfied with the effects of shooting control, such as changing various shooting parameters, but it somehow resulted in a success with some kind of operations being appropriately taken immediately. (That is, the user was fortunate to capture a high quality image.) Alternatively, with ambush shooting, there may be cases where an object being waited for appears, and it can be photographed. Accordingly, it can be said that high level shooting such as where, while confirming focus on a bird that has stopped, focus has been finely adjusted at the instant the bird flies off in a direction towards the camera, is a skill that can normally only be performed by a professional photographer. It is therefore preferable, for such high level shooting, to enable automatic operation and/or to provide advice so that these results can also be achieved by a beginner. Also, even if operation and confirmation cannot be sufficiently ascertained, unexpectedly skillful photography can be achieved.

In step S23, the fact that there is this type of situation is stored, namely the fact that shooting was performed with change to focus, exposure, and/or angle of view, etc., on shooting, or was controlled with guidance prior to the change, is stored. That is, some sort of operation or setting has coincidentally matched a scene. By learning the process that captured that scene, there is high possibility of obtaining a good result for the next time a similar scene occurs, with the same operation. It is therefore best to have performed storage so as to be able to replicate this process as much as possible.

On that basis, control at that time for every scene includes information about whether it was possible to unintentionally shoot, and was there instantaneous operation, and it is better to have means such as performing automatic control or shooting assistance, guidance, etc., so as to be able to reproduce that control. With a camera that has this type of function, it can also be considered to perform shooting by performing operations in line with this guidance, and so storage is performed in steps S11 and S23 to include the fact there was assistance with such guidance. If a scene and operations are stored in association, photographs of a profession skill level are accumulated, and it is possible to link automatic shooting and appropriate advice, etc. Accidental or arbitrary determination is not important, but if a nice photograph was taken by chance, advice may be given to practice what is required to capture a nice photograph in the future, or even in a case where it looks like any practice or advice would be futile, there may have been automatic control for compensating that part.

In a case where shooting is not by chance, since it is shooting resulting from consideration and training, unnecessary automation is not required. Accordingly, if it is possible to determine that the shooting is unintentional or not unintentional, it is better to perform such determination. Such a determination can be performed extremely simply using possibility of success of instant operations, scenes, number of times operations are performed, possibility of success and level of difficulty of control for the similar scenes (with difficulties such as a plurality of parameters at the same time, reproduction is difficult, which means that it is possible to reduce the burden on the user by automating at least one control).

As described here, in a case where confirmation, such as visual recognition of shooting results at the first timing, is possible, it can be considered that the user's preference is reflected each time confirmation is made, and more abundant user image and preference information for storage will be included than for an example where visual recognition is not possible. Further, due to the fact that operations such as shooting are entered, it is possible to grasp features of images that the user prefers to store, which means that the determination of relationships between images and operations, as has been described here, constitutes extremely abundant user information, and it can be utilized in determinations and learning that indicate meaningful suggestions to subsequent user operations.

Next, the fact that shooting could be performed unintentionally (for example, automatic shooting, inadvertent manual shooting, etc.) is stored (S25). As was described previously, in processing leading to step S23, shooting was possible by changing shooting quality, and the possibility of being able to shoot unintentionally was also high. Information to that effect is therefore stored in the storage section 4 and the memory 1q. It should be noted that in this step S25, items of shooting quality that have been changed may be stored in the storage section 4, temporary storage section 3, or memory 1q. Also, based on the storage in the case where there the same situation as this arises during live view display, guidance display to that effect can be displayed to the photographer as appropriate. Once this storage has been performed the originating flow (S49 shown in FIG. 4B) is returned to.

In this way, in the flow for comparison test determination shown in FIG. 3A and FIG. 3B, in the event that there is a first selection image (for example, an image that has been acquired by instructing still image shooting) and/or a second selection image (for example, an image that the user has designated from a list of images that have been temporarily stored before and after still image shooting) it is determined whether or not to perform movie storage on the basis of these items of information (referred to S1-S7). This means that it is easy to generate a movie that looks good, even if it is not as the user intended. It should be noted that with this embodiment, steps S3, S5, etc., determined some conditions. However, regarding these conditions, some of them may be changed, other conditions may be added, and further, processing order may be changed.

In the flow for comparison test determination, a first selection and/or a second selection in each are compared, and differences between the two, and features of an object, are stored (refer to steps S13 and S15). These items of information indicate the user's preferences, and since it is effective information it can be utilized in user shooting assistance. As shooting assistance, if candidate images which are liked by the user are displayed, from among images that have been temporarily stored before and after still image shooting (refer to S43, S45, S57 etc. in FIG. 4B), then even if there are a large amount of images that have been temporarily stored the user can decide on images that are to be stored simply and rapidly.

That is, the conditions where storage as images is intended and images preferred by the user are associated with each other, and such association is reflected into subsequent shooting and storage, etc., which enables various benefits to be obtained. From an aspect of image visibility, there is various parameter control, and as a still image it is desired for the best single frame to be absolutely perfect in terms of a relationship between background and main subject, main subject size, orientation, focus position, exposure and color reproduction, etc. Since degree of perfection of one frame is high, it is expected that there will be improvement to degree of perfection even at the time when images of that single frame move and become a movie. Quality as a movie is accordingly desired, but in a case of a short scene, it may be considered as being within still images or a series of still images, and since a movie can be said to be an accumulation of such short scenes, at a low level, preferences for still images may be taken as preferences for a movie of one scene.

Next, a shooting control operation will be described using the flowcharts shown in FIG. 4A and FIG. 4B. Operation here is implemented by the CPU 1p controlling each section within the camera 10 in accordance with a program that has been stored in the memory 1q. It should be noted that the flow shown in FIG. 3A and FIG. 3B that was described previously is operation for comparison determination result of step S49, which will be described later.

If a power switch is turned on, the flow for shooting control is commenced. If the flow for shooting control is commenced, first live view display and temporary storage (A) are performed (S31). Here, temporary storage (A) of image data based on pixel signals from the image sensor 2b in the temporary storage section 3 is performed. Image processing is then applied to this temporarily stored image data by the live view image processing section 1b, and resulting image data is subjected to live view display on the display section 8. The temporary storage section 3 performs temporary storage every time image data of a single frame is input, up to a given frame number, and if image data in excess of the given frame number is input, older image data is deleted (for example, overwritten) and the newest image data is temporarily stored.

Once live view display and temporary storage (A) have been performed, next attitude, handshake, and features of the screen and object are detected (S33). Here, the image feature determination section if detects attitude, handshake, and features of the screen and object.

Next, it is determined whether or not control for shooting is provided by the user (S35). Here it is determined whether or not the user has operated exposure control operation members such as for aperture and shutter speed, angle of view operation members such as a zoom operation ring, or shooting control operation members such as a focus adjustment operation member, such as a range ring. Further, determination is also performed for operations such as shooting, such as whether or not camera orientation has been changed towards an object, from camera attitude detection.

Regarding actions referred to as this shooting control, it is not always necessary to achieve the effect of this embodiment, which is enabling shooting assistance with the user's taste reflected, since there may also be cases where the user is satisfied with the results of automation technology, under conditions where automatic exposure, automatic focusing, automatic review control and various other automated technology would be reflected. Conversely, further satisfactory shooting with the result of automation technology means that the result of the automation technology has some information regarding the user's taste. Also, if there is an operation for shooting control, the shooting control would include even more abundant information as actions taken by the user for obtaining images required, and this can be extremely effective information in reflecting the photographer's preferences, which is a feature of this embodiment. Specifically, confirmation of a live view image and operations at that time can be said to be actions to perform control so as to take natural scenery and events changing daily into an image that is most favorable to the photographer at their own volition.

With a live view image that has been obtained at this time, it is to be expected that visibility and legibility under those conditions will have increased integrity up to a level that is worthwhile playing back. That is, since this relationship between condition and control is established in a situation such that user consciousness and concentration are heightened for catching transitory events and objects to be reproduced the most preferably, a lot of valuable information can be obtained in the process of giving instructions to the device by operating with fingers or voice, in the case of voice operation, while evaluating a target, and the condition and the background thereof visually, and with constant changes in those parameters.

Using this type of information, effective guidance and advice is given to a user again aiming at the same object, or another user who has waited for the same type of conditions and target, or alternatively, using the device and software assistance results in valuable reference information when performing automation of control. As mentioned above, despite the fact that this type of confirmation at the time of live view and shooting parameter operations is important, the reason it is not always necessary is because there are cases where the user may be satisfied with the previously described automatic control. However, in a case where there is an intention to attempt shooting and storage, information utilized for automatic control can be substituted for guidance and advice (for guided manual shooting), and shooting operations which will be described later can be representative of user preference with regard to a relationship such as shooting control at this time, supplementary shooting conditions and shooting parameters.

If the result of determination in step S35 is that control for shooting has been performed, it is determined whether or not there is an item to be reflected in a similar scene (S51). Shooting control that has been performed by the user is preferably the performing of shooting control based on learning results of steps S9, S15, S19, S21, S23, S25 etc. Then, if there is a similar scene that was learned previously, shooting guidance is preferably displayed so as to achieve a taken image that is consistent with an image that the photographer intends to take. In this step, the image feature determination section if analyzes the current scene based on a live view image, etc., and determines whether or not there is an item reflected in a similar scene based on the results of this analysis and stored items that have been accumulated. A reflected item (or reflected item difference) is used as a shooting guide in order to make quality of an image high, and learning results are reflected in this reflected item. This reflected item uses parameters such as aperture value, focal length, etc., and shooting method, way of shooting, and shooting control may also be used as a reflected item for other than parameters.

If the result of determination in step S51 is that there is an item reflected in a similar scene, differences from the reflected item are displayed (S53). Here, differences between recommended control elements in a similar scene and control elements that are currently set (exposure, focus, angle of view, etc.) are displayed on the display section 8.

If the result of determination in step S35 is that control for shooting has not been performed, it is determined whether or not there is any unused item reflected in a similar scene (S37). The user has not performed control for shooting, but if a current scene that has been analyzed by the image feature determination section if is a scene that is similar from among various scenes that are stored in the storage section 4 or the memory 1q, it is determined whether or not recommended control for the similar scene and control that is currently set are different.

If the result of determination in step S37 is that there is any unemployed control as an item to be reflected in a similar scene, guidance is issued regarding the item and it is also reflected, etc. (S55). Here, based on results of learning, control of elements that have yet to be executed, such as exposure, focus, angle of view, etc., is performed. Also, at the time of this control what type of control is being performed (reflected item) is displayed on the display section 8.

If the result of determination in step S37 is that there is not used as a reflected item, or if guidance and application of a reflected item is performed in step S55, or if differences from a reflected item have been displayed in step S53, or if the result of determination in step S51 is that there is not a reflected item in a similar scene, it is next determined whether or not still image shooting will be performed (S39). If the photographer has observed the live view display and has determined composition, etc., the release button of the still image shooting section 6b is operated. In this step, determination is performed based on the operating state of the release button. If the result of this determination is that the release button has not been operated, processing returns to step S31.

Actions such as this still image shooting are not absolutely necessary to effectively achieve the effect of this embodiment, but since actions performed when acquiring an image the photographer wishes to acquire involved including abundant information, it can be an extremely effective information source in reflecting the photographer's preference. Specifically, a still image is for preserving natural scenes and events changing daily into a still state at one's own volition, and that single frame is therefore intended to be made into a product or a documentary work, and that can be said to be the user's purpose. For a still image obtained at this time, it can be expected that integrity at that moment will be increased to the extent that it will be worth looking at again later. That is, the instant of this shooting is a situation such that user consciousness and concentration are heightened the most for catching a crucial moment of transitory events and objects, a lot of valuable information can be obtained in the process of giving instructions to the device by operating with fingers or voice, in the case of voice operation, while evaluating a target, and the condition and the background thereof visually, and with constant changes in those situation. Even with errors such as response lag or being early, in all probability, it is conceivable that there will be things the user wants in images before and/or after this operation timing.

Using this type of information, effective guidance and advice is given to a user again aiming at the same object, or another user who has waited for the same type of conditions and target, or alternatively, using the device and software assistance results in valuable reference information when performing automation of control. As mentioned above, despite the fact that this type of operation to acquire still images is important, the fact that it is not always necessary is because a shot of an object can be missed due to missing the ideal timing or unforeseen circumstances, and depending on some kinds of restrictions there is a possibility of a situation where that operation is limited. However, the user's intention to want to image and store at the first timing will serve this purpose.

If the result of determination in step S39 is still image shooting, still image and storage are performed, and further storage of a given number of frames (B) is performed (S41). In this step, before still image shooting, if shooting control is necessary this shooting control is performed. As this shooting control, in the case of a scene for which it was desirable to deal with shooting timing, such as changing frame rate in S19 of FIG. 3A etc., it is a scene in which it was desirable to change focus, exposure, angle of view, etc., at the time of shooting in S23. Besides this, if there is control before shooting that has been learned as a result of comparison and determination, this is executed.

In step S41, if necessary shooting control has been performed before still image shooting, or if it is a case where this type of shooting control is not performed, next still image shooting and storage are performed. Here, for each pixel of the image sensor 2b pixel signals are accumulated in accordance with a subject image, accumulation of pixel signals is completed if a time corresponding to a shutter speed has elapsed, and then the pixel signals are read out and temporarily stored in the temporary storage section 3. Image data that has been temporarily stored is subjected to image processing by the image processing section 1c and S compression and expansion section 1j, and stored in the storage section 4.

In step S41, if imaging for still image shooting is performed and pixel signals read out, next temporary storage of a given number of frames (B) is performed. After having taken a still image also, similarly to before still image shooting, image data based on pixel signals from the image sensor 2b is temporarily stored in the temporary storage section 3. Once a given number of frames have been temporarily stored, this temporary storage is completed.

If the processing of S41 has been performed, next list display of obtained images is performed (S43). Here, a series of images of a given number of frames that were acquired using temporary storage (A) that was commenced in step S31, still images that were acquired in step S41, and a series of images of a fixed number of frames that were acquired after the still image shooting and temporarily stored (B) are subjected to list display on the display section 8 (refer, for example, to FIG. 5A and FIG. 5B). It should be noted that besides this display where all images are displayed at one time, it is also possible to display a sequence of images, a single frame at a time, or display a number of frames one at a time. In this case, preferred images may be selected by the user from among images that have been sequentially displayed by a touch operation or button operation, etc.

Once list display of the obtained images has been performed, it is next determined whether or not there is a similar scene and if reflecting this similar scene is worthwhile (S45). Here, determination is in accordance with whether or not it is possible to display the best shot that is in line with the user's preference as a candidate image, from among a list of required images that were displayed in S43.

If the result of determination in step S57 is that there is a similar scene and that reflection is possible, supplemental display is etc. is performed (S57). Here, the best shot that fits with the user's preference is displayed as a candidate image. The number of candidate images is not limited to one, and there may be a plurality of candidate images. Also, as a display method, in the case of list display images may be surrounded by a thick border or colored border, etc., and it is also possible to discriminate from non-candidates by changing the size of an image or the like. Also, instead of list display, in the case of sequential display also display may be performed so that it is possible to discriminate between candidate images and non-candidate images.

If supplemental display etc. has been performed in step S57, or if the result of determination in step S45 was that nothing was adopted as a reflected item, it is detected whether or not there is selection (S47). Once the list display of acquired images has been performed in step S43, the photographer selects images that are to the stored in the storage section 4 from among the images that have been subjected to list display using a touch operation or the like. In this step it is detected in whether or not an image has been selected using a touch operation or the like. In the event that a given time elapses with no selection, or in a case where a non-selection icon or the like has been touched, non-selection is handled.

If it has been detected whether or not an image has been selected, next comparison test determination is performed (S49). This comparison test determination is as was described using the flowcharts shown in FIG. 3A and FIG. 3B. Specifically, a first selection (still image at the time of a release operation) and a second selection (image that has been selected by the photographer from list display) are compared, and using feature information learning is performed with respect to shooting control in order to later acquire taken images that fit with the photographer's preference. For example, deep learning may be performed using training data made up of a series of images and information as to whether or not there has been selection within this series of images. As a result of this deep learning, it is possible to generate an inference model that can obtain specific selected images using inference. The determination section may select still images and movies that fit with the user's preference using the inference model that has been generated. As training data used in the deep learning, it is possible to use not only image data, but also information such as focus information, exposure control information, angle of view information, etc. By performing learning incorporating these items of information, it is possible to reflect various conditions that the photographer (user) likes. Once this processing for comparison test determination has been performed, processing returns to step S31. It should be noted that if the power switch is turned off, the flow for shooting control is terminated.

In this way, with the flow for shooting control, using information that has been stored for the comparison test determination of FIG. 3A and FIG. 3B (differences between features of an object and a selected image), in the case of a scene that has been stored and a similar scene, shooting guidance is performed using information that has been stored. Determining whether or not there is a similar scene may be based on attitude and handshake of the camera, and features of screens and objects, etc. (refer to S33). If there is a similar scene, based on information that has been stored previously, either automatic shooting is performed with control values (exposure, focus, angle of view, etc.) that fit the user preferences, or guidance display is performed (S53 and S55). This means that it is possible to easily acquire images that the user likes. It should be noted that with the flow for shooting control, still picture shooting is performed (S39, S41) but still picture shooting is not absolutely necessary. For example, in step S39 if it is determined that a power on operation has been performed, if it is determined that power has been supplied, if it has been determined that the user is holding the camera, or if it has been determined that a given operation has been performed by the user, the processing of step S41 may be omitted and the processing of step S43 and after performed. In this case also, it is possible to obtain the same effects as for the case where still pictures were taken, by selecting an image that has been stored (refer to S47).

Next, learning based on images that have been taken using the camera of this embodiment will be described using FIG. 5A and FIG. 5B. Description will also be given of examples of images that are suitable for storage as a movie and images that are not suitable for storage as a movie.

Figure 5A:
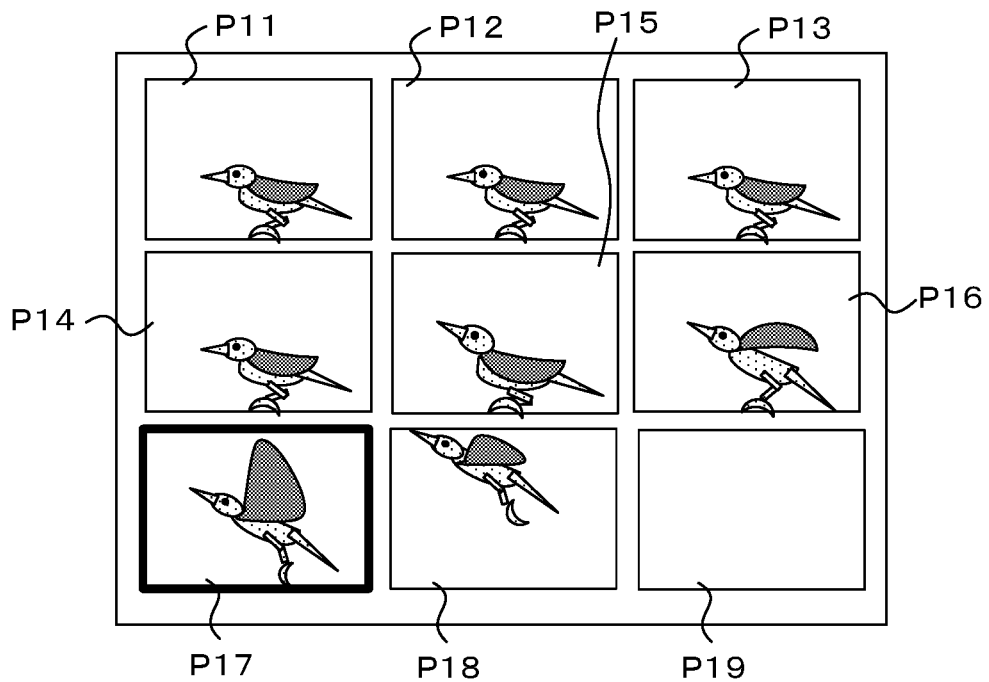
FIG. 5A and FIG. 5B are drawings showing examples of images that have been continuously taken by a camera of one embodiment of the present invention.

FIG. 5A shows an example of a series of acquired images for which a release operation was performed, when a bird is taking off. Image P17 is an image at the moment the photographer presses the release button, but at the instant this release button has been operated it is not possible to acquire image P17. Specifically, images P1 to P17 are images that have been temporarily stored in the temporary storage section 3 before a release operation (refer to temporary storage (A) of S31 in FIG. 4A). Image P18 is an image that has been taken as a result of operation of the release button by the photographer (refer to S39 and S41 in FIG. 4B), and image P19 is an image that has been stored in the temporary storage section 3 after still image shooting.

In the series of images of FIG. 5A, the bird is somewhat stationary (images P11 to P14), but after that the bird raises its head (image P15), spreads its wings (image P16), flaps its wings (image P17), and flies off (image P18), finally moving off the screen (image P19). Within the series of images, a still image that has been acquired by a release operation by the photographer is image P18 (first selection), but with the example of FIG. 5A the photographer designates image P17 as an image to be stored in the storage section 4 (second selection).

Since image P17 that has been temporarily stored is selected as an image for storage and not the image P18 at the time of the release operation, the camera 10 can learn the photographer's preferences by analyzing change in shape and position of an object. Specifically, when the bird flies off, as in image P17, it is possible to learn that an image where the bird is in the whole of the screen not only at the top of the screen (image P18) and has spread its wings widely is preferred. By accumulating this type of learning, when list display has been performed it is possible to display image P17 as a candidate image. With the example shown in FIG. 5A, this fact is shown by making the border of image P17 bold. Besides making the border bold, other methods of display may be adopted.

Also, there is movement such as shown in FIG. 5A, specifically first selection or second selection (refer to S1 in FIG. 3A), there is an object that is the same as an earlier image for a short while (refer to S3), and shooting quality is also the same (refer to S5), and so a selected image and images before and after that selected image are subjected to movie storage (S7 in FIG. 3B), and features of the object and patterns of a movie are stored (refer to S9). A series of images such as shown in FIG. 5A are of a bird moving smoothly and hold up artistically as a movie and so they are stored as a movie and not just as still images.

Quality as a movie is accordingly required, but in a case of short scene it may be considered to be within still images or a series of still images, and since a movie can be said to be an accumulation of such short scenes, at a low level, preferences for still images may be taken as preferences for a movie of one scene. Operation here is effective in simply creating this preferable one-scene movie.

Figure 5B:
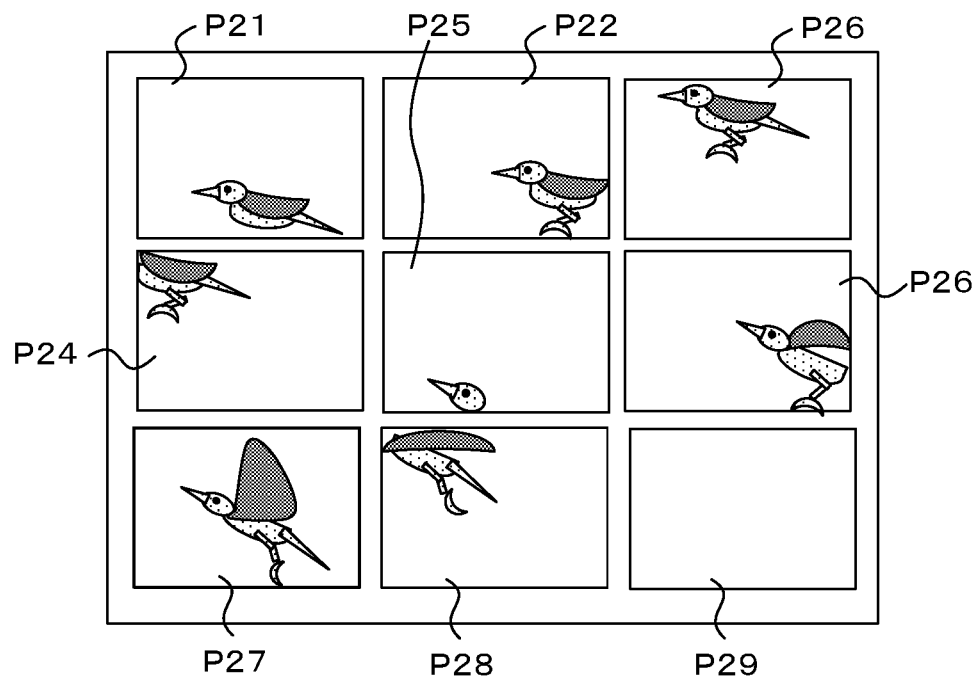

FIG. 5B shows another example of a series of acquired images for which a release operation was performed, when a bird is taking off. In FIG. 5B also, similarly to FIG. 5A, from images P21 to P27 the images are temporarily stored images, image P28 is a still image that has been acquired in response to a release operation, and image P29 is an image that has been temporarily stored after still image shooting.

Within the series of images P21 to P29, unintentional image P27 has the same form and composition as image P17, and constitutes an image that fits the photographer's intention. However, from image P21 to P27, shooting direction of the camera 10 is indeterminate, and the position of the bird, which is an object, within the screen is unstable. This means that with the series of images shown in FIG. 5B, the position of the bird is unstable, and since it does not hold up artistically as a movie only the sill images are stored, and there is no storage as a movie.

In this way, if the photographer designates an image that does not correspond to a release operation as second selection, as shown in FIG. 5A and FIG. 5B, it is possible to learn the preference of the photographer by analyzing features of this image that was subjected to second selection and an image corresponding to a release operation (first selection) (S13 and S15 in FIG. 3B).

Also, until a still image is acquired, every time image data of one frame is output that image data is temporarily stored (S31 in FIG. 4A). Then, whether or not images are suitable is determined based on form, position and shooting quality etc. of an object within this series of images, and if images are suitable they are stored as a movie. As a result, it is possible to store not only a simple still image, but at the same time to also store a movie that holds up artistically. In selecting this movie, deep learning may be utilized. For example, deep learning is performed using training data made up of a series of images and information as to whether or not there has been selection within this series of images. With this deep learning an inference model is generated that infers an image of a single frame that the user would probably select from a series of images. By using this inference model it is possible to predict an image that has a high likelihood (reliability) of being selected. Using this predicted image and an image that is contiguous to this image it is possible to determine a one-scene movie that the user will like.

As has been described above, with the one embodiment of the present invention, a plurality of images are acquired by repeating imaging of an object at a first timing (refer, for example, to S31 in FIG. 4A), the plurality of images are stored (for example, S31 in FIG. 4A and S41 in FIG. 4B), second selection to select an image from among the stored images at the second time is performed (for example, S47 in FIG. 4B), and movie candidate frames are determined from the plurality of images, in accordance with comparison results of images at the second time and non selected images (S7 in FIG. 3B). Since movie candidate frames are determined in accordance with comparison of second selection images and non-selected images, it becomes possible to easily generate a movie that fits with the photographer's preference.

Also, with the one embodiment of the present invention, a plurality of images are acquired by repeatedly imaging an object at a first timing (refer, for example, to S31 in FIG. 4A), first selection to select an image when a shooting instruction has been issued during the first timing is performed (refer, for example, to S39 and S41 in FIG. 4B), second selection to select an image from among temporarily stored images at a second time is performed (refer, for example, to S47 in FIG. 4B), an image is selected using first selection or second selection, and in the event that a temporarily stored image satisfies given conditions a movie that has been generated based on stored images is stored (refer, for example, to S3 and S5 in FIG. 3A, and S7 in FIG. 3B). As a result, it is possible to easily generate a movie that holds up artistically. This type of selection action is performed by choosing images likely to be in conformity with the user's taste and discarding others among a series of images, and such action happen to include an abundant information source for analogizing, leaning and determining user preferences with the meaning of a relationship between selection of shooting object (situation, background, orientation and expressions etc. of main subject and subject group), situation, image quality and shooting parameters at the time of having acquired that image (these include many things such as focus, exposure, composition, object size, and methodology for various image processing).

Also, with the shooting method of one embodiment of the present invention, a plurality of images are acquired by repeatedly imaging an object at a specified first time, the images that have been acquired are temporarily stored, first selection to select an image is performed at the specified first time within a first timing, second selection to select an image is performed at a second time from among the temporarily stored images, an image that has been selected by the first selection and/or the second selection is selected, and in the event that the images that have been temporarily stored satisfy given conditions a movie that has been generated based on the stored images is stored.

It should be noted that with the one embodiment of the present invention, learning was performed at the time of shooting as shown in FIG. 4A and FIG. 4B. However, this is not limiting, and learning may also be performed at the time of playback. Also, a target to be controlled based on learning results is not limited to focus, exposure, angle of view etc. and there may be control elements for acquiring taken images that fit the user's preferences. Obviously quality as a movie is accordingly required, and for example, there may be situations where although an image is sufficient and preferable as a still image, that same image is not preferable as a movie as the duration of those still images is too short, and motion before and after the still image is unnatural etc. From this standpoint, it is preferable to improve learning of the user's preferences so at to achieve a degree of perfection in the movie. In this regard, user reaction at the time of movie playback, or after that, constitute valuable information. However, in the case of a short scene it may be considered to be within still images or a series of still images, and may be simplified by subjecting to a determination to add only duration (both too short and too long are unfavorable) or movement direction (there may also be unnatural movement) etc.

Also, with the one embodiment of the present invention, shooting guidance being performed based on learning results, and shooting control being performed automatically have been described for the case of still images. However, learning results may also be reflected in movies.

Also, with the one embodiment of the present invention, the comparison section 1d, determination section 1e, image selection section 1g, first selection section 1h, second selection section 1i etc. have been configured separately from the CPU 1q, but some or all of the sections may be configured using software, and executed by the CPU 1q. Also, besides being constructed using hardware circuits and simple parts, the present invention may also be constructed in the form of software using a CPU and programs, or may be constructed in hardware such as gate circuitry generated based on a programming language described using Verilog, or may use a hardware structure that uses software such as a DSP (digital signal processor). Suitable combinations of these approaches may also be used.

Also, with the one embodiment of the present invention, an instrument for taking pictures has been described using a digital camera, but as a camera it is also possible to use a digital single lens reflex camera or a mirrorless camera or a compact digital camera, or a camera for movie use such as a video camera, and further to have a camera that is incorporated into a mobile phone, a smartphone, a mobile information terminal, personal computer (PC), tablet type computer, game console etc., or a camera for medical use, or a camera for a scientific instrument such as a microscope, a camera for mounting on a vehicle, a surveillance camera etc. Even with a camera, as a medical camera, that automatically performs imaging a number of times within a body, as with capsule endoscopy, since confirmation is performed for every image repeatedly taken at a first timing and every frame at a second time, the present invention is applicable, and is also similarly applicable to, for example, industrial inspection equipment and drones.

In any event, it is possible to adopt the present invention as long as an imaging device is capable of performing continuous shooting. It is a tremendous burden on a user to have to adjust shooting parameters, variously including focus, exposure and shooting angle, composition, size of an object and methodology of various image processing, especially those having movement to a level that the user is most satisfied with. Accordingly, the present invention can provide a device, system and method that assist the user in obtaining images required, with the extraordinary effect of reducing the burden on the user, either automatically or semi automatically, or by giving effective advice and guidance.

Also, in recent years, it has become common to use artificial intelligence such as being able to determine various evaluation criteria in one go, and it goes without saying that there may be improvements such as unifying each branch etc. of the flowcharts shown in this specification, and this is within the scope of the present invention. Regarding this type of control, as long as it is possible for the user to input whether or not something is good or bad, it is possible to customize the embodiment shown in this application in way that is suitable to the user by learning the user's preferences. Also, a person shooting a series of images and a person selecting an image that they like from among this series of image maybe be different.

Also, with the one embodiment of the present invention, operation of this embodiment was described using flowcharts, but procedures and order may be changed, some steps may be omitted, steps may be added, and further the specific processing content within each step may be altered. It is also possible to suitably combine structural elements from different embodiments.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order. Also, at the time of implementation using artificial intelligence, although there are the same industrial ethics, it is possible to customize accordingly. The present application has been described with an example of a release button or the like of a conventional camera in order to make applied scenes clear, but the present application is not limited to a release button, and a touch panel, voice operation or dedicated sensor etc. may be appropriately applied.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments. In particular, operations that utilize vital reactions, including speech recognition, need sensors, interfaces and determination circuits respectively suitable to each of the operations, but have not been described in order to avoid complication, but it is hereby stated that the present invention can also be achieved by means of various improvements and alternative technology that would substitute for these user manual operations.

What is claimed is:

1. An imaging device, comprising:
an image sensor that acquires a plurality of images by repeatedly shooting an object;
a temporary storage memory that stores images that have been acquired by the image sensor;
a first operation member through which a user selects a specified image from the image sensor at a first time specified by a user operation of the first operation member;
a second operation member through which a user selects an image at a second time, which is after the first time, from among images that have been stored in the temporary storage memory; and
an image storage memory that stores a movie that has been generated based on a group of images that have been selected by the user using at least one of the first operation member and the second operation member,
wherein the first time is a given period before and after a user instruction to acquire a still image, and
wherein the second time is a time at which, after still image acquisition, an image that will be finally stored in the image storage memory is selected by the user from among a plurality of images that have been acquired using the image sensor.

2. An imaging device, comprising:
an image sensor that acquires a plurality of images by repeatedly shooting an object at a first timing;
a memory that stores the plurality of images; and
a controller that has a second selection section through which a user selects images at a second timing from among images stored in the memory, and a movie candidate section that determines movie candidate frames from among the plurality of images in accordance with comparison results of images that have been selected or not selected at the second timing,
wherein the first timing is a given period before and after a user instruction to acquire a still image, and
wherein the second timing is a time at which, after still image acquisition, an image that will be finally stored is selected by the user from among a plurality of images that have been acquired using the image sensor.

3. The imaging device of claim 2, wherein
the controller has a first selection section through which a user selects images at a specified first time, within the specified first time, and
the movie candidate section determines movie candidate frames when images have been selected in at least one of the first selection section and the second selection section.

4. The imaging device of claim 2, wherein:
the movie candidate section determines the movie candidate frames in the event that the plurality of images are of the same object, over a given period.

5. The imaging device of claim 2, wherein:
the movie candidate section determines the movie candidate frames in the event that shooting quality of the plurality of images is the same, over a given period.

6. The imaging device of claim 2, wherein:
the controller has an image group information learning section that learns information relating to a specified image group from among the plurality of images that have been stored in the memory, and
the memory stores information that has been learned by the image group information learning section.

7. The imaging device of claim 6 wherein:
the movie candidate section, in a shooting preparation state, determines movie candidate frames from among the plurality of images in the event that images that have been acquired by the image sensor are images of similar scenes to those that were acquired previously, on the basis of information stored in the storage section.

8. The imaging device of claim 7 wherein:
the controller displays differences between recommended shooting control at the time of the images of similar scenes, and shooting control that is currently set, on a display.

9. The imaging device of claim 6, wherein:
the controller has an image feature determination section that determines features of an object based on images that have been acquired using the image sensor, and
the image group information learning section learns information about a specified image group from the plurality of images, based on features of the object that have been determined by the image feature determination section.

10. The imaging device of claim 6 wherein:
the controller has a first selection section through which a user selects images at a specified first time, within the specified first time, and
the image group information learning section, when an image has not been selected by the first selection section and/or the second selection section, in the event that an object and a shooting quality from a previously taken image matches an object and a shooting quality of an image captured by the image sensor, stores a direction for shot timing.

11. The imaging device of claim 10 wherein the shooting quality is at least one of a focus, an exposure, or an angle of view.

12. The imaging device of claim 6 wherein:
the controller has a first selection section through which a user selects images at a specified first time, within the specified first time, and
the image group information learning section stores lost countermeasure in the event that either, (A) when images have been selected by at least one of the first selection section and the second selection section, and an image of an object that matches an object of a selected image has not been acquired, or (B) an image has not been selected by the first selection section and the second selection section, and an object and a shooting quality of an image captured by the image sensor does not match an object and a shooting quality of any previously captured image.

13. The imaging device of claim 12 wherein the lost countermeasure is used to avoid losing track of the object.

14. The imaging device of claim 6 wherein:
the controller has a first selection section that selects images at a specified first time, within the specified first time, and
the image group information learning section, when an image has been selected by at least one of the first selection section and the second selection section, if an image of an object that is the same as the object of a selected image has been acquired, but it is not of the same shooting quality as shooting using the image sensor, provides user guidance for changing shooting control.

15. The imaging device of claim 2, wherein
the memory has a temporary storage memory temporarily storing images that have been acquired by the image sensor, and
images that have been selected by the second selection section are stored in the memory.

16. The imaging device of claim 15 wherein:
the controller has a first selection section that selects images at a specified first time, within the specified first time, and
when images have been selected by the first selection section or the second selection section, a movie based on images that have been stored in the temporary storage memory, in the event that at least either an object that is the same as in a selected image has been obtained, or there is the same shooting quality as in a selected image, is stored.

17. An imaging method, comprising:
acquiring a plurality of images by repeatedly shooting an object at a first timing;
temporarily storing the plurality of images;
performing second selection to select, responsive to a user selection input, images at a second timing from among temporarily stored images; and
determining movie candidate frames from among the plurality of images in accordance with comparison results of images that have been selected or not selected at the second timing,
wherein the first timing is a given period before and after a user instruction to acquire a still image, and
wherein the second timing is a time at which, after still image acquisition, an image that will be finally stored in a memory is selected by the user from among a plurality of images that have been acquired using an image sensor.

18. The imaging method of claim 17, wherein:
images are selected at a specified first time, within the specified first time, and
movie candidate frames are determined when an image has been selected at at least one time, among the first timing and the second timing.

19. The imaging method of claim 17, wherein:
movie candidate frames are determined in the event that, over a given time period, the plurality of images are of the same object, or shooting quality of the plurality of images is the same.

20. The imaging method of claim 17, wherein:
information relating to a specific group of images, from the plurality of images that have been temporarily stored, is learned, and
information relating to the specific group of images is stored in memory.

* * * * *